Feb. 4, 1964 C. LAUTH 3,120,038
HIGH PRESSURE PERMANENT MOLDING
Original Filed Aug. 4, 1960 5 Sheets-Sheet 5
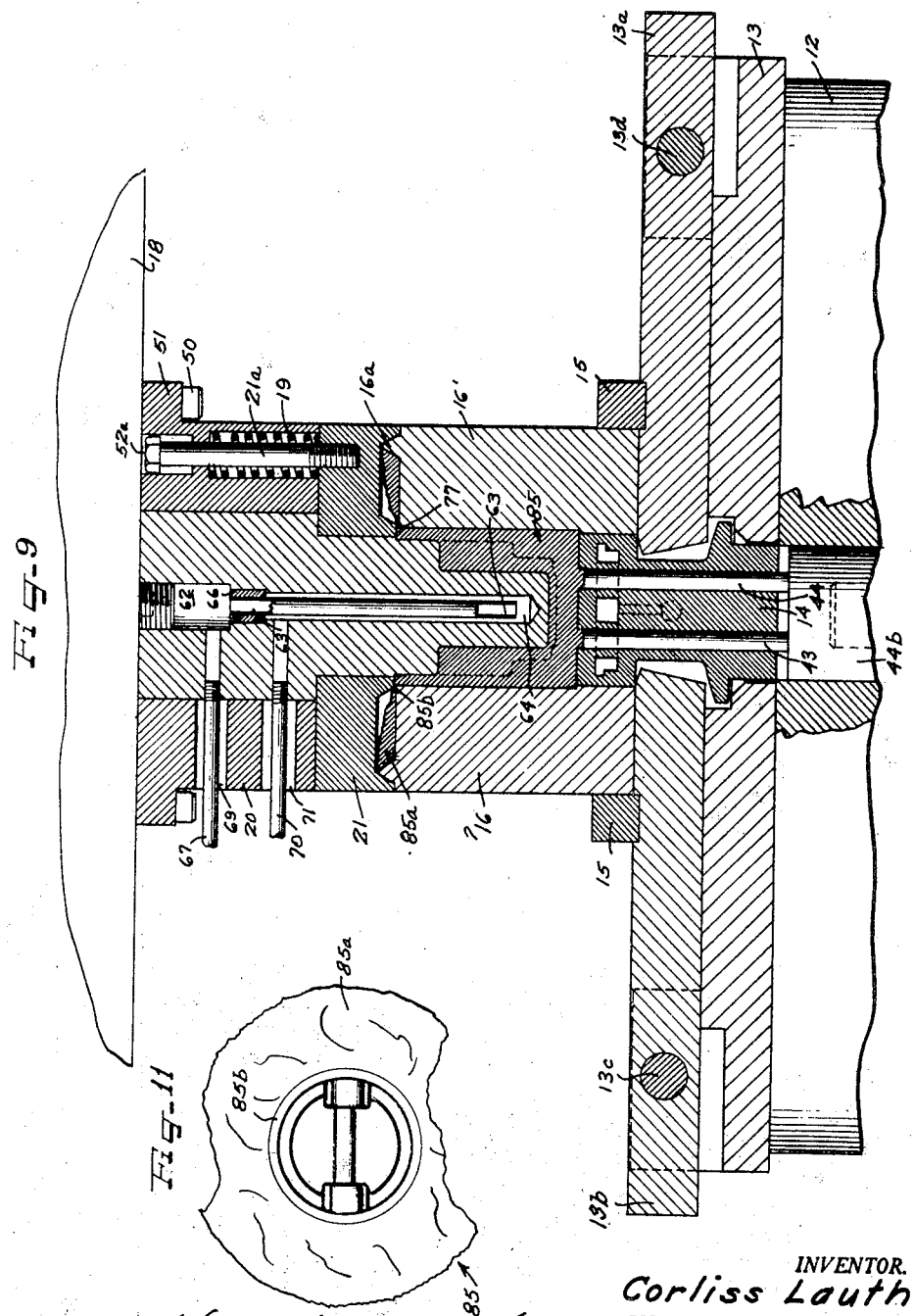
INVENTOR.
Corliss Lauth
BY
ATTYS.

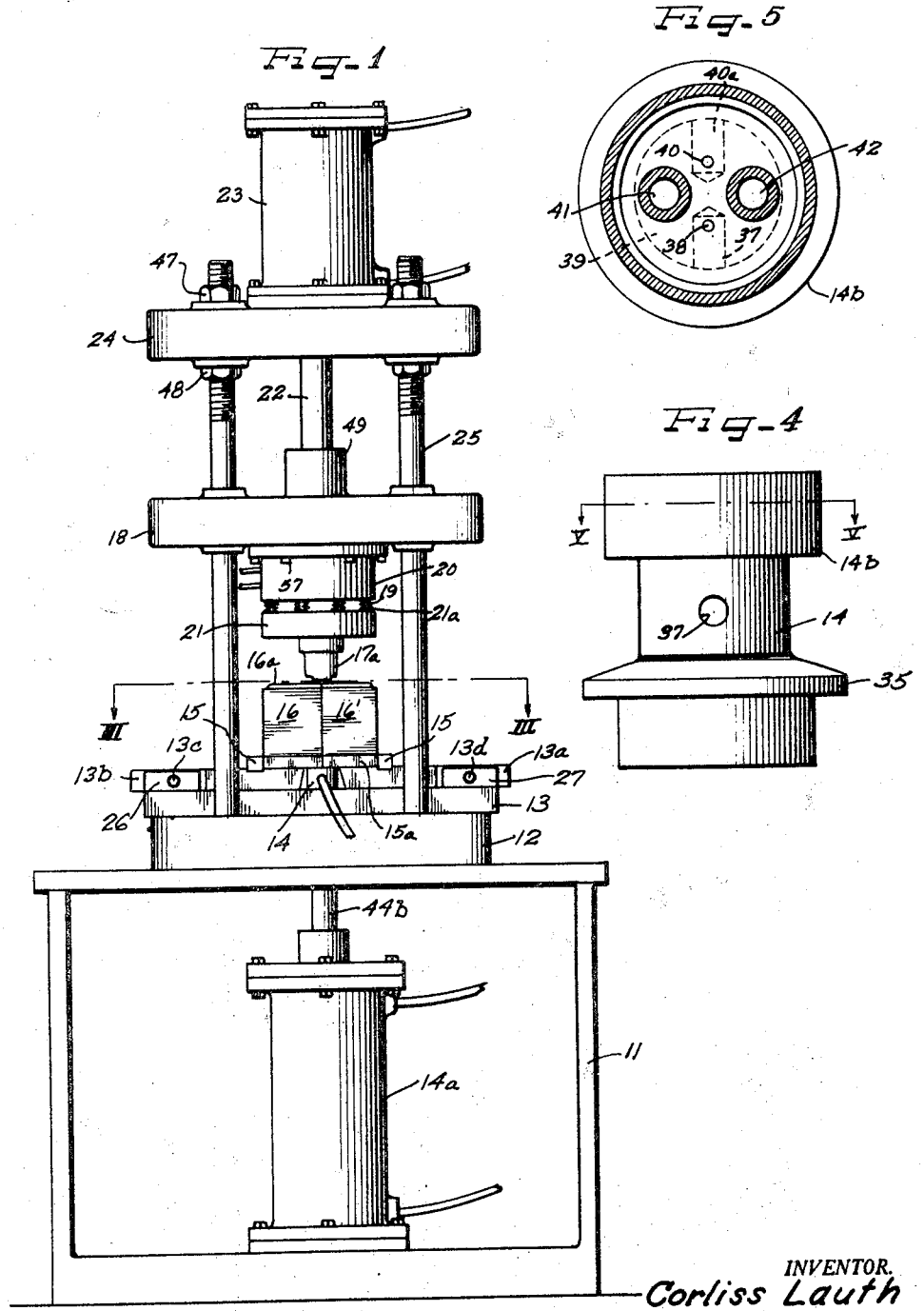

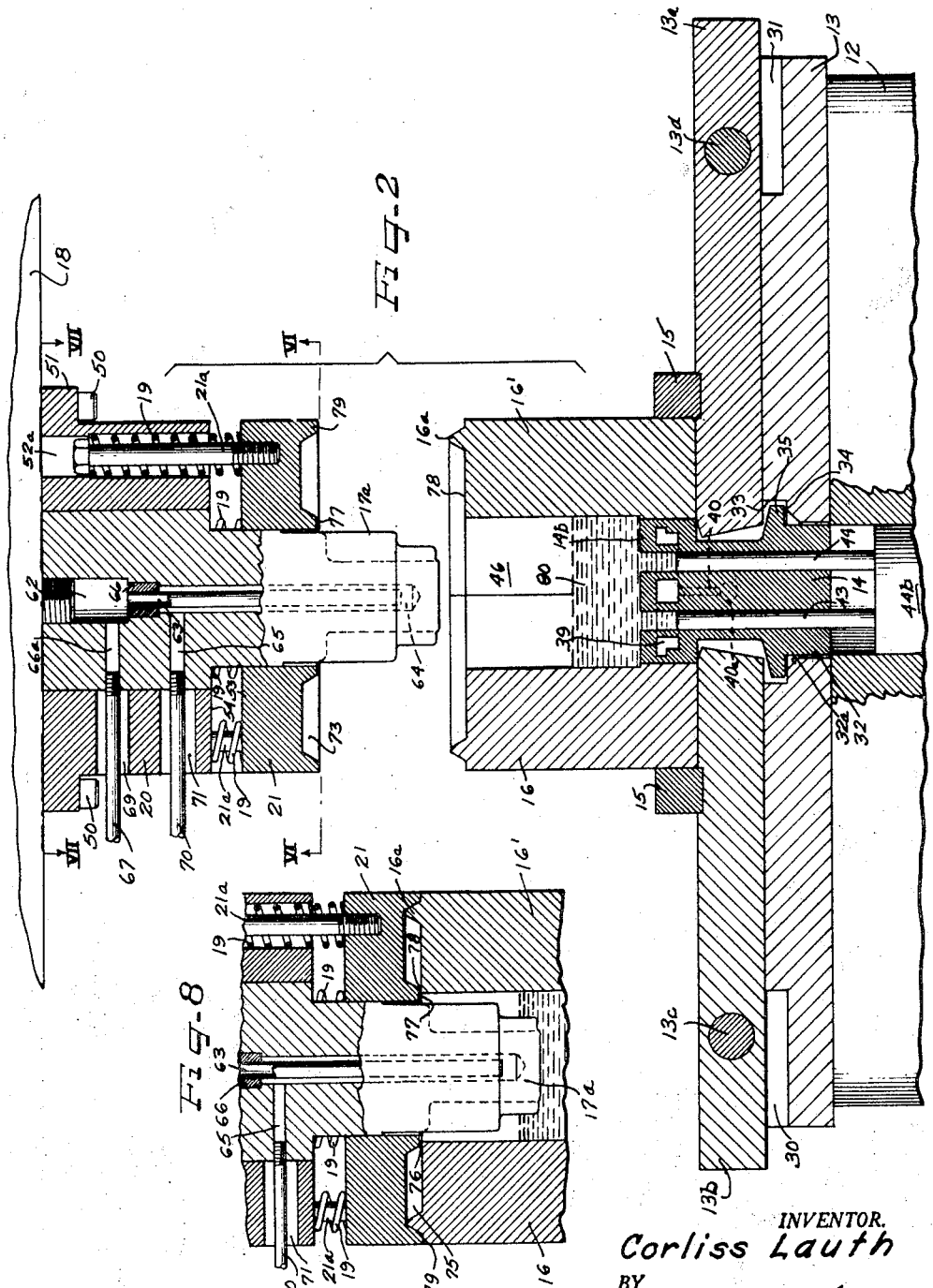

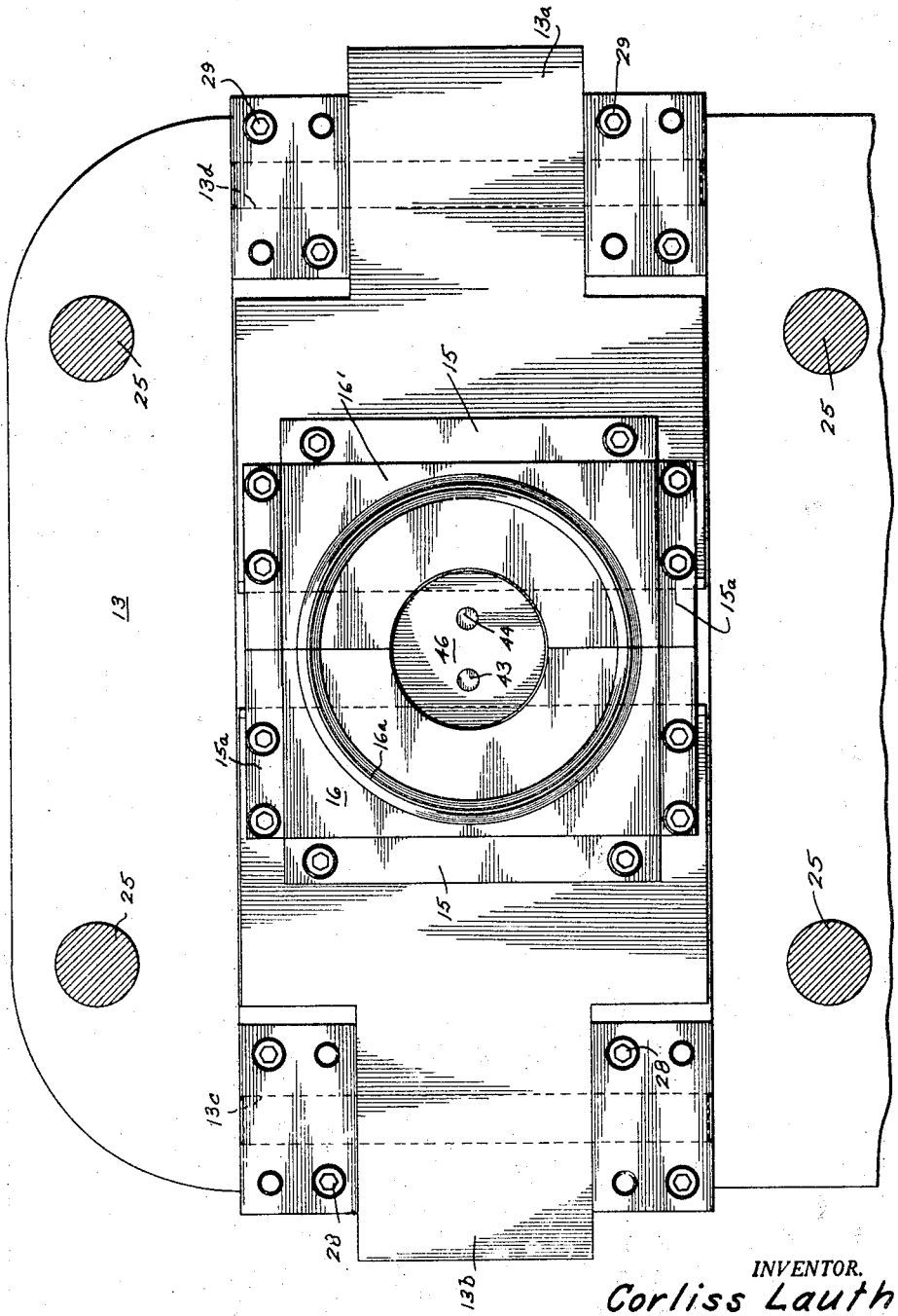

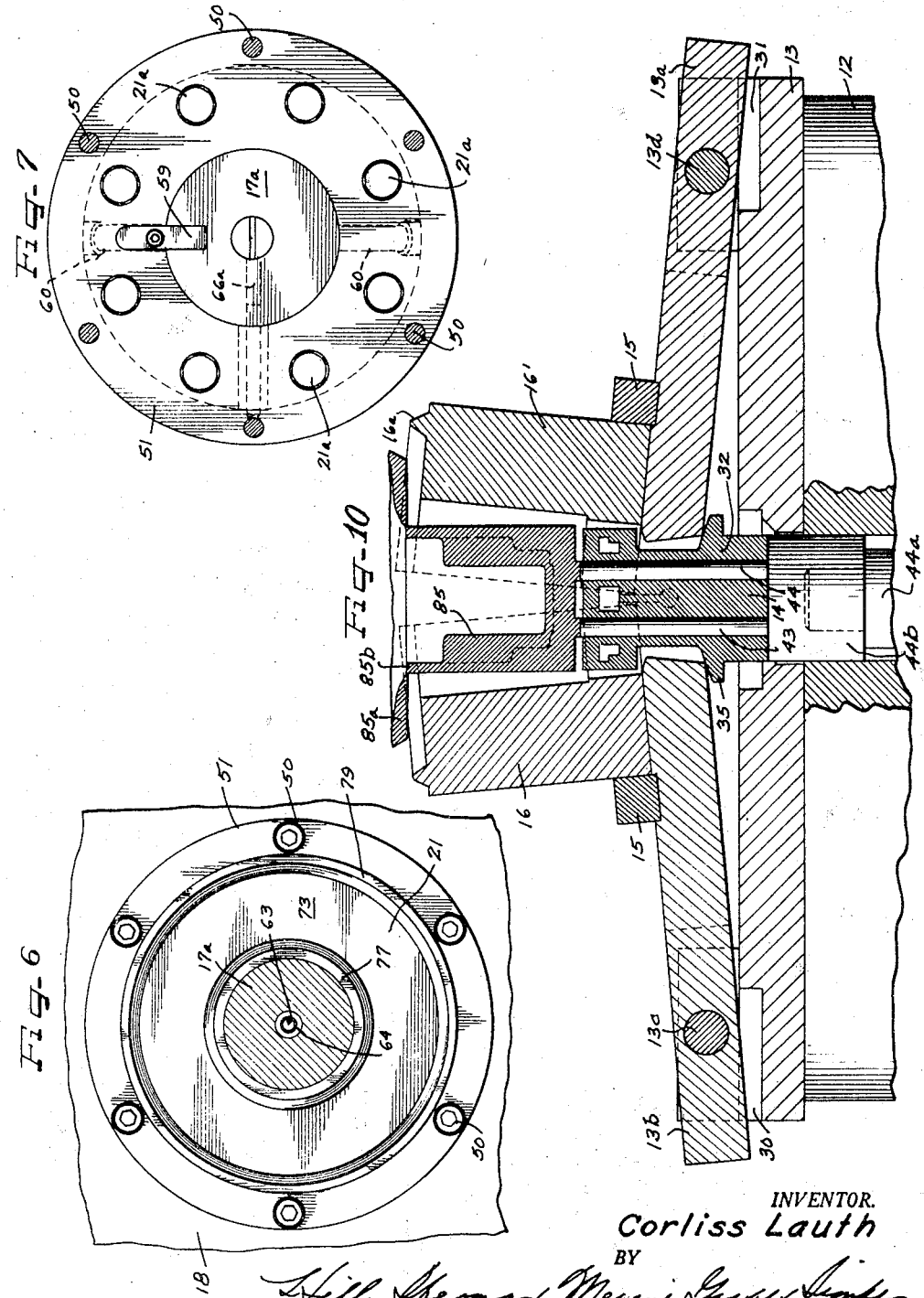

United States Patent Office 3,120,038
Patented Feb. 4, 1964

3,120,038
HIGH PRESSURE PERMANENT MOLDING
Corliss Lauth, East Detroit, Mich., assignor to Cast Forge Corporation, Detroit, Mich., a corporation of Michigan
Continuation of application Ser. No. 47,490, Aug. 4, 1960. This application Aug. 29, 1962. Ser. No. 220,329
11 Claims. (Cl. 22—67)

This invention relates to the manufacturing of pistons or other articles and more particularly to improved methods and means for high pressure molding of internal combustion engine pistons from molten metal involving filling of a die cavity followed by the insertion of a plunger in the metal to form a core and thereafter controlling of the flow of metal under pressure thereby producing a piston requiring no inside finish.

The instant application is a continuation of my earlier filed application Serial No. 47,490, filed August 4, 1960, now abandoned.

In accordance with this invention, light weight metals, such as aluminum or aluminum alloys, may be heated to above their melting points and poured in a die mold. A sealing collar is then wedge fitted on a complementary tapered rim of the split die mold. The collar and mold rim define a chamber for receiving the molten metal overflow from the die cavity which communicates with the die cavity through a narrow passage to restrict metal flow and to hold the pressure in the die cavity.

The plunger type core has a snug sliding fit in the collar and as the core is urged into the molten metal pool, the excess metal flows into the overflow chamber.

The molten metal is poured into the die cavity in a quantity in excess of that required for molding of the piston. The stationary base of the die assembly includes retractable plungers communicating with the die cavity which operate to force the excess metal into the die cavity to compensate for metal loss due to cooling-caused shrinkage. When the molten metal has cooled sufficiently, the movable core assembly is retracted, and a pneumatically or hydraulically operated piston assembly which carries the plungers contacts and ejector assembly which pivots the split dies open and pushes out the newly formed piston or other articles.

A feature of this invention resides in the provision of a spring biased collar carried by the movable core platen which positively pre-seats on the rim of the split die before the molding pressures are applied to the collar and die assembly by the core. The above arrangement eliminates the heretofore required gates, riser formation, and related molding components, and, in addition, reduces the required setting time for the metal.

Apparatus found useful in the practice of the present invention permits closer tolerances in piston fabrication to be obtained than in the prior art permanent mold devices since no coatings are required for the die. Moreover, inside finishing is eliminated and the close tolerances obtained give ease in external finishing. A finer grain in the material of piston construction and other articles is obtained because of the faster chill permitted and a better structural strength is obtained.

It is therefore an object of the present invention to provide improved pistons and other articles.

Another object of the present invention is to provide a method of molding metal pistons and other articles under high pressure conditions.

A still further object of the present invention is to provide a method of making molded aluminum pistons and other articles.

A still further object of the present invention is to provide a method of making internal combustion engine type pistons from aluminum and aluminum alloys by filling the die cavity of the molding apparatus with molten metal followed by insertion of a plunger in the metal to form the core and controlling the flow of metal under pressure.

It is yet another object of the present invention to provide high pressure molding apparatus for the manufacture of components of the irregular contour.

A still further object of the present invention is to provide apparatus for high pressure molding with a minimum of parts.

Yet another object of the present invention is to provide pistons molded under high pressure conditions requiring a minimum of finishing and of fine grain and high structural strength.

A still further object of the present invention is to provide apparatus for high pressure molding of pistons with apparatus simple and compact in construction and efficient and high speed in operation.

These and other features, objects and advantages of the present invention will become more apparent upon a careful consideration of the following detailed description, when considered in conjunction with the accompanying drawing illustrating preferred embodiments of the present invention wherein like reference characters and numerals refer to like or corresponding parts throughout the several views.

On the drawing:

FIGURE 1 is a front elevational view of molding apparatus according to this invention.

FIGURE 2 is a fragmentary view in vertical cross section of the apparatus of FIGURE 1.

FIGURE 3 is a view taken along lines III—III of FIGURE 1.

FIGURE 4 is a view in elevation of the ejector assembly of the apparatus of FIGURE 1.

FIGURE 5 is a view taken along lines V—V of FIGURE 4.

FIGURE 6 is a view taken along lines VI—VI of FIGURE 2.

FIGURE 7 is a view taken along lines VII—VII of FIGURE 2.

FIGURE 8 is a fragmentary view in partial section illustrating the spring biased positive sealing feature of the die and collar arrangement of the apparatus in FIGURE 1.

FIGURE 9 is a fragmentary view in partial section illustrating the high pressure molding step of the method of the present invention.

FIGURE 10 is a fragmentary view in partial section illustrating the ejection feature of the present invention.

FIGURE 11 is a plan view of a piston produced in accordance with my invention.

As shown on the drawing:

Briefly stated, apparatus for piston manufacture illustrated in FIGURE 1 may include a base support member 11 carrying the die assembly base 12, having secured thereto an ejector assembly base member 13 which has pivotally mounted thereto the ejector actuator arms 13a and 13b which are adapted to move by contact with an ejector 14 operatively responsive to a pneumatic or hydraulic ejector piston assembly 14a. Removably held by a plurality of restraining members 15 is a generally rectangularly shaped split die 16 and 16' and which are provided with a raised annular flange 16a. A movable platen 18 seats a plurality of springs 19 in a sleeve 20. Springs 19 urge a movable collar 21 from contact with the sleeve 20 and surround movable collar support means 21a. Collar 21 has a peripheral flange complementary to the rim 16a of the split die adapted to cooperate therewith to define a chamber for receiving molten metal overflow from the die wall. Movably carried by the platen 18 is a die core 17a dimensioned to the desired internal configuration of piston to be formed.

The platen 18 is movably carried by a shaft 22 which is movably actuated by a pneumatic or hydraulic piston arrangement 23. A stationary platen 24 may support the piston assembly 23 and may serve as a support for a plurality of guide members 25 for the movable platen 18 and core assembly 17a.

Referring particularly to FIGURE 2, wherein the core is shown in the retracted position, the ejector follower arms 13a and 13b are provided with pivots 13c and 13d, respectively, each of which is journalled in a pair of raised bearing members 26 and 27 secured to the ejector assembly support 13 as by bolts 28 and 29 respectively. The ejector assembly base 13 is recessed as at 30 and 31 to permit a wider pivot arc for members 13a and 13b (FIGURES 2 and 3).

Centrally located within the base member 13 is a bore indicated by the numeral 32 which is provided with a tapered shoulder 32a and counterbore 33 for receiving the ejector 14 and providing a shoulder 34 for the peripheral annular flange 35 of the ejector 14.

Similarly each of the T-shaped arms 13a and 13b is inwardly tapered from the top surface to prevent binding thereof with the ejector 14 during the ejection operation.

As more clearly appears in FIGURE 3, the split die 16—16' is rectangular in shape and is held in position by a plurality of bracket members 15 carried by the actuator arms 13a and 13b and die flanges 15a.

The core guides 25 may, if desired, pass through the base member 12 and be secured in the base member 11.

As appears in FIGURES 2, 4 and 5, the ejector assembly is provided with means for cooling the split die thereby reducing the time required to solidify the molten aluminum. For this purpose, the ejector 14 is provided with an inlet conduit 37 for introducing a cooling medium into an internal passage 38 which communicates with an annular passage 39 in the upper portion of the ejector which seats the split die 16. The annular passage 39 in the ejector head 14b communicates with a similar internal outlet passage 40 and an outlet passage 40a for discharge of the coolant medium from the ejector.

The ejector assembly, as appears in FIGURE 5 is provided with a pair of bores 41 and 42 adapted to receive plungers 43 and 44 slidable therethrough which are carried by the piston 44a and piston rod 44b of the pneumatically or hydraulically actuated assembly 14a. The bores 41 and 42 define reservoirs or accumulator spaces which freely and directly communicate with a mold cavity 46 internally of the mold sections 16 and 16' through an end face thereof, defined by the upper extremity of the ejector assembly. The bores are cylindrical and have their axes parallel to the longitudinal axes of the mold cavity 46. The purpose and operation of the plungers 43 and 44 will be described in more detail hereinafter.

The split die mold comprises two sections 16 and 16', each of which is provided with a rim 16a inwardly of the outer periphery thereof which define therebetween the molten metal die well or chamber 46 and which, for purposes of the example hereof, is cylindrical in configuration.

As aforementioned, the upper core portion of the apparatus of FIGURE 1 includes a stationary platen 24 which may carry the core piston assembly 23 and may serve as support means for the guides 25 of the core carrying movable platen 18. Guides 25 may be secured at the lower end in the support member 12 and to the stationary platen 24 at the upper end in threaded engagement therewith as by nuts 47 and 48.

As appears in FIGURE 1, the movable platen 18 has secured thereto or formed integral therewith an upper boss 49 adapted to secure the piston rod 22 of the core piston assembly 23 to the platen 18. Secured as by bolts 50 to the underside of the movable platen 18 is the peripherally flanged sleeve 20.

Inwardly of the flange 51, the sleeve or ring 20 is bored to receive the plurality of movable threaded members 21a adapted to retain and support the collar 21. Adjacent the collar 21, the ring 20 is counterbored to receive springs 19 which urge the collar from contact with the ring 20. The spring 19 seats against the shoulder provided by the counterbore in the ring 20 and is bottomed against the collar 21. Each of the pin receiving bores is counterbored adjacent the movable platen 18 to permit contact between the opposed faces 53 and 54 of the ring and collar during the molding operation, as clearly appears in FIGURE 9.

The core head 17a is prevented from rotation by a key 59 as appears in FIGURE 7 and is removably secured to the ring 20 as by bolts (not shown) inserted through slots 60 formed in the ring 20.

Centrally located in the core head 17a is a stepped passage defining a cooling medium inlet 62 communicating with a passage of smaller diameter 63 which is opened at the bottom end to permit circulation of the cooling medium in the fluid passage 64 which communicates with the fluid outlet passage 65. The passage conduit 63 is supported by a plug 66 which prevents fluid passage from circulation passage 64 into inlet passage 62. Inlet passage 62 communicates with an outlet 66a which may be adapted to receive the fluid inlet conduit 67 which passes through a bore 69 provided in the ring 20. Similarly, outlet conduit 65 is adapted to receive conduit 70 which passes through a similar bore 71 in the ring 20. Thus a circulation system is provided for the core head 17a which cooperates with the circulation system provided in the ejector 14 to reduce the time required to set the molten metal being formed in the die cavity 46.

The collar 21 carried by the bolts 21a is provided with an annular channel 73 inwardly of the periphery thereof and has complementarily tapered surfaces for engagement with the rim 16a of the split die members. Thus, the rim 16a and the groove 73 of the collar 21 cooperate as appears in FIGURE 8 to define a chamber 75 which receives the overflow of molten metal from the die cavity 46 which is permitted to flow therein through an annular passage 76 of restricted height defined by the internal flange 77 of the collar 21 and the opposed top surface 78 of the split die. The peripheral flange 79 of the collar 21 and the rim 16a of the die 16 cooperate in abutting engagement to prevent extrusion of molten metal thereacross to the exterior of the apparatus.

The core of course is shaped to provide the inside diameter for the particular component to be molded in the apparatus above described and for purposes of illustration is shown as a trunk type internal combustion engine piston interior contour.

As an example of the operation of the apparatus of FIGURE 1, a high silicon content aluminum alloy (MS143) preferably formed of the following general composition was heated to a pouring temperature of approximately 1220° F.:

| | Percent |
|---|---|
| Silicon | 11 |
| Manganese | 1 |
| Copper | 2 |
| Aluminum, balance. | |

Impurities such as the following may also be included in the alloy:

| | Percent |
|---|---|
| Iron | 1 |
| Zinc | 0.5 |

A preferred specific alloy forming the pistons in accordance with the practice of this invention includes the elements of the general composition noted above as well as the impurities noted above.

With the core retracted and the split dies in engagement as shown in FIGURE 2, the aluminum alloy is poured into the cavity 46 of the die 16. The plungers 43 and 44 are positioned as shown in the ejector 14 recessed in the bores 41 and 42 so that the molten metal poured into the die cavity is a bit in excess of that necessary to form the piston if a piston were to be made by the casting method.

With the plungers thus retracted the molten metal will flow into the bores 41 and 42 as clearly appears in FIGURE 2. A coolant is introduced through conduit 37 of the ejector assembly 14 and discharges through the conduit 40a (FIGURE 5).

A colant is also introduced into the core through conduit 67 for circulation and discharge through conduit 70. Piston assembly 23 is actuated and piston rod 22 moves the movable platen 18 downwardly.

In the second stage of operation the collar urged downwardly by the springs 19 engages the rim 16a of the split die before the plunger core 17a is fully positioned in the die cavity as appears in FIGURE 8. Thus the spring biased collar is positively seated on the rim 16a to define the flash or overflow chamber 75 before any of the overflow begins to pass through the restricted passage defined by the flange 77 of the collar 21 and the upper face 78 of the split die 16.

With the collar thus firmly seated defining the overflow chamber, the upper platen 18 continues in its downward movement against the force exerted by the springs 19 until contact is made between the opposed faces 53 of the ring 20 and 54 of the collar 21, as appears in FIGURE 9. The pins 21a will have been moved to their uppermost position in the recesses 52a when contact between the collar and ring 20 is made. Similarly, with the core 17a moving into the pool of molten metal alloy 80 the displaced molten metal will flow through the restricted passage defined by the collar flange and die surface into the overflow chamber 75. It will be appreciated that the ejector 14 serves as a base or bottom for the molten pool.

The circulation system in both the core and ejector reduces the operating temperature within a range from about 350° F. to about 450° F. if water is the cooling medium. After the metal has partially set, the plungers 43 and 44 are moved upwardly toward the die cavity by the action of the piston assembly 44 after an appropriate period of time to compensate for the shrinkage of the molten metal which takes place as the metal solidifies. Movement of the plungers in compensating for the metal loss in the die cavity due to shrinkage does not cause displacement of the metal through the narrow, restricted passage leading to the overflow chamber since the metal in the restricted passage has frozen or solidified before the plungers 43 and 44 are moved upwardly.

It is preferable to position the shrinkage compensating plungers so as to force the metal upward from a position which is easily accessible for finishing purposes.

Heretofore it was necessary to permit a chill time from 2 to 10 minutes in order to permit setting of the molten metal before the piston was removed from the die cavity. By my method, the time required for setting is reduced to 10 to 30 seconds since a colder die is used and because the pressure forces are employed to control flow.

For example above given the core 17a was constructed of high die steel material sold by the Crucible Steel Company under the trade name "NU-DIE-V" which is a hot work chromium-vanadium steel. The die 16 of the above example was a low alloy sold by the Wheelock-Lovejoy Company under the trade name "hy-Ten B-3X" which is a ferrous alloy of nickel and chromium.

After an appropriate setting time preferably within the range of from about 10 seconds to about 30 seconds has elapsed, the piston assembly is then actuated to retract the core 17a from the die cavity. As the core is being initially withdrawn from the die cavity, the springs 19 maintain the collar 21 firmly seated on the die rim 16a until the core 17a is in the position shown in FIGURE 8. Thus the core 17a is retracted to some extent before the heads of the members 21a engage the shoulders in the counterbores of the ring 20 and carry the collar 21 from contact with the rim. The ejector piston assembly 14a may be synchronously actuated (FIGURE 1) to move the piston head 44b upwardlly in contact with the ejector 14 as appears in FIGURE 10. The head 44b then will continue its upward movement whereby the ejector 14 is unseated and the flange 35 of the ejector engages the ejector actuator arms 13a and 13b and pivots the arms upwardly. The split die 16 "cracks" and the molded piston 85 is now ready for removal from the apparatus.

The molded piston 85 in the position shown in FIGURE 10 is supported only by the plungers 43 and 44 and is easily removed therefrom.

As appears in FIGURE 11, the flash 85a of the molded piston is quite thin near the inner periphery of the piston and may be easily removed therefrom. The end surface 85b of the sleeve portion of the piston is substantially and uniformly flat requiring a minimum of machining of this area. No finishing is required on the inside of the piston and the close tolerance permitted by the molding method described above facilitates external finishing of the piston. Thus sound pistons are obtained in less time thereby increasing production rate, and, because of the reduced chill time required, a finer grain piston is obtained having greater structural strength than was heretofore considered obtainable without additional treatment of the piston. In addition grain refiners such as titanium, boron, etc., are not required as alloy additives. Moreover, in the molding operation, closer tolerance may be obtained than was heretofore possible with the permanent die type apparatus which must be coated to prevent attack on the permanent dies in the high temperature, slow cooling permanent die methods.

If desired, conventional toggle arrangements may be employed to maintain the core in the die. For this purpose, the toggle cleats may be secured to the upper stationary platen 24 and to the movable platen 18.

The flash 85a of the piston of FIGURE 11 is merely broken off and the piston then subjected to a heat treatment immediately. For the aluminum piston of the above example, the piston was aged for a period of 8 hours at 400° F. and then air quenched.

It will therefore be appreciated with the high pressure molding apparatus and methods of the present invention, that I provide means for the elimination of gates, risers, shorten the time required to set the molded piston, and obtain a piston of higher quality than was heretofore obtainable without the necessity of additional alloying elements or fabrication steps and treatments.

Although minor modifications might be suggested by those skilled in the art, it should be understood that I wish to embody within the scope of the present warranted hereon, all such embodiments as reasonably and properly come within the scope of my contribution to the art.

I claim as my invention:

1. Apparatus for high pressure permanent molding of articles from molten metal comprising: die means defining a core-receiving die cavity; movable die core carrying means; a separate collar movably carried by said core carrying means normally biased from contact therewith, said biased collar being adapted to contact said die means and remain in contact therewith when said core is being inserted or retracted from said cavity and to cooperate with said die means to define therebetween a molten metal overflow chamber communicating with said die cavity through a narrow, restricted passage; said core carrying means being movable to a second position in pressure contact with said collar to insert the core in the die cavity for applying article forming pressure to molten metal therein whereby excess metal flows from cavity into said overflow chamber; ejector means for unseating a formed molded article in said cavity including at least one chamber communicating with said die cavity and a movable member in said chamber for forcing molten metal into said cavity to compensate for metal volume loss due to solidification-caused shrinkage; means for moving said ejector member to force molten metal from said ejector chamber into said die cavity; means for reciprocating said core carrying means; and means for cooling said die cavity.

2. Apparatus for high pressure molding of articles from molten metal comprising: die means defining a core-receiving die cavity; a movable die core-carrying platen; means normally biasing a separate collar movably carried by said platen from contact therewith, said biased collar being adapted to contact said die means and remain in contact therewith when said core is being inserted or retracted from said cavity for applying molding pressure on molten metal in said cavity; said contacting collar and said die means cooperating to define therebetween a molten metal overflow chamber communicating with said die cavity through a narrow, restricted passage; said platen being movable to a second position in pressure contact with said collar to insert the core in the die cavity for applying article-forming molding pressure on molten metal therein, whereby excess metal flows from said cavity into said overflow chamber; ejector means for unseating a formed molded article in said cavity including at least one chamber communicating with said die cavity and a movable member in said chamber for forcing molten metal into said cavity to compensate for metal volume loss due to solidification-caused shrinkage, means for moving said ejector member to force molten metal from said ejector chamber into said die cavity, and means for cooling said die cavity.

3. Apparatus for high pressure permanent molding of articles from molten metal comprising: split die means defining a core-receiving die cavity; a movable, die core carrying platen; means normally biasing a separate collar movably carried by said platen from contact therewith, said biased collar being adapted to contact said die means and remain in contact therewith when said core is being inserted or retracted from said cavity, said collar and die means being in contacting cooperation to define therebetween a molten metal overflow chamber communicating with said die cavity through a narrow, restricted passage said platen being movable to a second position in pressure contact with said collar to insert the core in the die cavity for applying article-forming molding pressure on molten metal therein whereby excess metal flows from said cavity into said overflow chamber; ejector means for splitting said die means and for unseating a formed molded article in said cavity including at least one chamber communicating with said die cavity and a movable member in said chamber for forcing molten metal into said cavity to compensate for metal volume loss due to solidification-caused shrinkage, means for moving said ejector member to force molten metal from said ejector chamber into said die cavity, and means for cooling said die cavity.

4. Apparatus for high pressure permanent molding of articles from molten metal comprising: a stationary base member; split die means on said base member defining a core-receiving die cavity therebetween; a movable die core-carrying platen disposed to position a die core in said cavity; a separate collar movably carried by said platen normally biased from contact with said platen, said biased collar being adapted to contact said split die means when said platen is in a first position before said core is fully inserted or retracted from said die cavity for applying molding pressure therein, said collar and said split die cooperating to define a metal overflow chamber communicating with said die cavity through a narrow, restricted passage therebetween; said platen being adapted to move to a second position against the force of the collar biasing means to thereby contact said collar and position said core in said die cavity for applying article-forming molding pressure on molten metal therein whereby excess metal flows into said overflow chamber through said restricted passage; an ejector assembly for separating said split die means including at least one chamber communicating with said die cavity and a movable member in said chamber for forcing metal from said chamber into said die cavity to compensate for metal volume loss due to solidification-caused shrinkage, and means for moving said ejector member to force molten metal from said ejector chamber into said die cavity.

5. Apparatus for high pressure permanent molding of articles from molten metal comprising: split die means defining a core-receiving die cavity; a reciprocal platen carrying a die core, spring means normally biasing a separate collar movably carried by said platen from contact therewith, said collar being adapted to contact said die means and remain in contact therewith when said core is being inserted or retracted from said cavity for applying molding pressure on molten metal in said cavity; said contacting collar and said die means in contacting cooperation to define therebetween a molten metal overflow chamber communicating with said die cavity through a narrow, restricted passage; said platen being movable to a second position in pressure contact with said collar to position the core in the die cavity for applying article-forming molding pressure on molten metal therein whereby excess metal flows from said cavity into said overflow chamber; ejector means for opening said split die means and for unseating a formed molded article from said cavity including a housing defining the die cavity base and a pair of pivotable members supporting said housing operatively responsive to movement of said ejector housing to separate said split die means, said housing having at least one chamber therein communicating with said die cavity and a movable member in said chamber for forcing molten metal into said cavity to compensate for metal volume loss due to solidification-caused shrinkage; means for moving said ejector member in said chamber to a position whereby molten metal is forced from said ejector chamber into said die cavity; means for moving said ejector assembly to pivot said ejector assembly arms and to separate said split die means when said core is retracted, and means for cooling said cavity.

6. Apparatus for high pressure permanent molding of piston assemblies from molten metal comprising: die means defining a core-receiving die cavity; reciprocal die core carrying means; a separate collar movably carried by said core carrying means normally biased from contact therewith, said biased collar being adapted to contact said die means and remain in contact therewith when said core is being inserted or retracted from said cavity and to cooperate with said means to define therebetween a molten metal overflow chamber communicating with said die cavity through a narrow, restricted passage; said core carrying means being reciprocably movable to a second position in pressure contact with said collar to insert the core in the die cavity for applying piston forming pressure to molten metal therein whereby excess metal flows from said cavity into said overflow chamber; ejector means for unseating a formed piston in said cavity including at least one chamber communicating with said die cavity and a movable member in said chamber for forcing molten metal into said cavity to compensate for metal volume loss due to solidification-caused shrinkage; means for moving said ejector member to force molten metal from said ejector chamber into said die cavity; means for reciprocating said piston carrying means; means for moving said ejector means to unseat a formed piston in said cavity, and means for cooling said piston die cavity.

7. In apparatus for high pressure permanent molding of articles from molten metal, the improvement comprising: a base having a stepped bore therethrough adapted to carry split die means defining a die core receiving cavity, the shoulder provided by the stepped portion of the base bore being adapted to support a movable ejctor housing positioned in said bore for ejecting a formed article from said cavity, an ejector housing in said bore defining the base of said cavity, movable arms carried by said base operatively responsive for movement to the relative position of said ejector housing in said bore for opening said split die means, said housing having at least one chamber therein communicating with said die cavity for receiving a movable member adapted to force molten metal from said chamber into said die cavity to thereby compensate for metal volume loss due to solidification-caused shrinkage.

8. In an apparatus for permanent mold casting of metals susceptible to substantial solidification shrinkage in transition from a molten state to a solid state, means operable to define a closed chamber having a mold cavity of fixed volume and having end faces, one of said faces being in free and open communication with a reservoir and said cavity also being in communication with a second chamber via a restricted passage, a piston movable from a normally maintained first position into said reservoir to reduce the volume of said reservoir, first hydraulic motor means operable when said piston is in said normally maintained first position to displace molten metal in said closed chamber to completely fill said cavity, reservoir and restricted passage with a charge of molten metal, said restricted passage being of a size such that upon the completion of the displacement of metal by said first motor means the metal in said passage solidifies while the metal in said cavity and reservoir is still molten to seal the cavity and reservoir from said second chamber, and second hydraulic motor means actuatable to drive said piston from said first position into said reservoir to reduce the volume of said reservoir while molten metal in said cavity and reservoir is solidifying to displace molten metal under pressure from said reservoir into said cavity to compensate for solidification shrinkage of metal in said cavity.

9. In a method of casting in a permanent mold a metal susceptible to substantial solidification shrinkage in its transition from a molten state to a solid state, the steps of overfilling a mold cavity of fixed volume and having a longitudinal axis to overspill a limited amount of molten metal through a restricted passage interconnecting said cavity and a chamber outside the cavity, accumulating a body of molten metal in a cylindrical space having an axis parallel to the axis of the mold cavity extraneous to said cavity but freely communicating with the molten metal in said cavity, chilling the over-spilled metal in said passage to seal the remaining still-molten metal in the cavity, advancing only after said chilling step a piston in said space to reduce the volume of said space while maintaining constant the volume of said cavity to thereby displace molten metal from said body into said cavity, said molten metal thus being displaced under a pressure different from and greater than that in said cavity, and continuing to so displace the molten metal from said space into said cavity until the metal in said cavity has solidified.

10. In a method of casting in a permanent mold a metal susceptible to substantial solidification shrinkage in its transition from a molten state to a solid state, the mold including a cavity of fixed volume and having end faces, an accumulator space extraneous to said cavity but freely and directly communicating with the cavity through an end face of said cavity, and a chamber communicating with said cavity through a restricted opening, the steps of filling said mold cavity of fixed volume with molten metal, accumulating a body of molten metal in said accumulator space extraneous to said cavity but freely and directly communicating with the molten metal in said cavity, sealing the still-molten metal in the cavity in communication with the molten metal in said accumulator space by solidification of molten metal in said restricted opening, advancing only after said sealing step a piston in said accumulator space to reduce the volume of said space while maintaining constant the volume of said cavity to thereby displace molten metal from said body into the said cavity at a pressure different from and greater than that in said cavity, and continuing to so displace the molten metal from said accumulator space into said cavity until the metal in said cavity has solidified into a casting having the shape of said cavity and free of porosity due to solidification shrinkage.

11. In a method of casting in a permanent mold a metal susceptible to substantial solidification shrinkage in its transition from a molten state to a solid state, the steps of filling a mold cavity having end faces and of constant volume with molten metal, accumulating a plurality of first bodies of molten metal in separate spaces, each of said spaces being extraneous to said cavity and the first bodies of molten metal therein freely and directly communicating with the molten metal in said cavity through an end face of said cavity, providing an additional body of molten metal communicating with said cavity at a peripheral portion thereof remote from said spaces through an opening of restricted cross-section, solidifying the molten metal of said additional body at said opening of restricted cross-section to seal the molten metal in said cavity while maintaining communication between said spaces and said plurality of first bodies therein and the molten metal in said cavity, simultaneously advancing a piston in each of said spaces containing said first bodies to reduce the volume of each of said spaces while maintaining constant the volume of said cavity to thereby displace molten metal from said first bodies respectively into said cavity through said end faces thereof at pressures different from and greater than that in said cavity, and continuing to so displace the molten metal from said spaces into said cavity until the metal in said cavity has solidified into a casting having the shape of said cavity and which is free of porosity due to solidification shrinkage.

References Cited in the file of this patent

UNITED STATES PATENTS

| | | |
|---|---|---|
| 1,153,258 | Robinson et al. | Sept. 14, 1915 |
| 1,697,741 | Vaughan | Jan. 1, 1929 |
| 1,961,942 | Pack | June 5, 1934 |
| 2,415,395 | Ulrich | Feb. 4, 1947 |
| 2,421,454 | Doering et al. | June 3, 1947 |
| 2,582,260 | Kutik | Jan. 15, 1952 |
| 2,781,547 | Moxness | Feb. 19, 1957 |
| 2,804,666 | Saives | Sept. 3, 1957 |
| 3,068,539 | Woilcoxon | Dec. 18, 1962 |
| 3,106,002 | Bauer | Oct. 8, 1963 |

FOREIGN PATENTS

| | | |
|---|---|---|
| 126,544 | Australia | Jan. 13, 1948 |